Oct. 24, 1961 J. H. MICHELS ET AL 3,005,953

TRANSISTOR CIRCUIT DESIGNING DEVICE

Filed Sept. 3, 1957 4 Sheets-Sheet 1

INVENTORS
John H. Michels &
William Rutt

BY Connolly and Hutz
ATTORNEYS

TRANSISTOR CIRCUIT DESIGNING DEVICE

Filed Sept. 3, 1957 4 Sheets-Sheet 2

INVENTORS
John H. Michels, &
William Rutt
BY Connolly and Hutz
ATTORNEYS

TRANSISTOR CIRCUIT DESIGNING DEVICE

INVENTORS
John H. Michels &
William Rutt

BY Connolly and Hutz
ATTORNEYS

TRANSISTOR CIRCUIT DESIGNING DEVICE

Filed Sept. 3, 1957 4 Sheets-Sheet 4

INVENTORS
John H. Michels &
William Rutt

BY Connolly and Hutz
ATTORNEYS

United States Patent Office 3,005,953

Patented Oct. 24, 1961

3,005,953

TRANSISTOR CIRCUIT DESIGNING DEVICE

John H. Michels, Red Bank, N.J., and William Rutt, Great Neck, N.Y., assignors to Sprague Products Company, North Adams, Mass., a corporation of Massachusetts Filed Sept. 3, 1957, Ser. No. 681,648
14 Claims. (Cl. 324—158)

This invention relates to a device for simulating transistor circuits to facilitate their design, and more particularly relates to such a device which provides an operative circuit without requiring the interconnection or soldering together of electrical leads or wires.

The design of transistor circuits is complicated by the sensitive interdependence of the various circuit components. For example, any change in the characteristics of the emitter portion of the circuit drastically affects the characteristics of the base and collector circuits. This same sensitive relationship holds true for a change in either base or collector circuit elements.

This design problem is further complicated by the fact that up to the present, it has not been possible to manufacture transistors economically to close performance tolerances. Selective production control has, therefore, been utilized to separate the manufactured transistors into various close performance tolerance classes. This lack of uniformity together with the difficulty of theoretical solution of design problems makes it necessary to resort to empirical test methods to make it possible to take the utmost advantage of the performance capability of each type of transistor. Heretofore, for example, the designer has constructed a bread board circuit into which components of varying impedance have been introduced in various circuit arrangements to determine optimum circuit parameters for a given transistor.

This bread board method is time-consuming and expensive even when special plug-type boards and special connectors are utilized, and it does not always yield dependable and reproducible results because there is no assurance that the circuits can be exactly duplicated at a later time. Furthermore, it is easily possible for even the most expert and experienced technician to connect the circuits incorrectly.

An object of this invention is to provide a foolproof device for quickly and conveniently determining in a uniform reproducible manner, the optimum parameters and circuit arrangements for components in a circuit including a given transistor.

In accordance with this invention, a number of separate circuits are incorporated within a casing. These circuits, for example, are an input, an output, and a common or ground circuit. A socket means is mounted upon the front panel, for example, of the casing to permit a transistor to be plugged into the circuit. Input and output terminal means are respectively incorporated in the input and output circuits for respectively providing and metering input signals and deriving and metering output signals. Variable potential source means are associated with the input and output circuits for providing operating voltages thereto. These input and output circuits also incorporate variable input and output impedance means. Selector switch means is mounted upon the panel for connecting the socket and plugged-in transistor with the input, output and common circuits in a preselectable variety of conventional transistor circuit configurations. Manually variable capacitor coupling means are incorporated in the input and output circuits for varying the manner in which these circuits are coupled. Variable impedance means are connectable in predetermined advantageous configurations relative to the input, output and common circuits to provide means for interposing known values of impedance in any of the aforementioned elements. Terminal socket means may also be provided for incorporating additional impedance elements in the circuit to supplement those provided within the casing.

Control means are provided on the panel for manually adjusting the values and optionally switching on and off each of the aforementioned elements. Indicating means are also provided on the panel associated with each of these control means for indicating the settings thereof which provide optimum performance.

The performance of these circuits are determined or monitored, for example, by metering means connected to appropriate input and output terminals. The operation of the device may be made inherently graphical by segregating the control elements for the input and output circuits at the sides of the panels while the socket and selector switch are placed at the center of the panel. This simplifies the electrical connection problem and physically places each portion of the circuits in a position which corresponds with its position in conventional schematic electronic representation.

Novel features and advantages of the present invention will become apparent to one skilled in the art from a reading of the following description in conjunction with the accompanying drawings wherein similar reference characters refer to similar parts and in which.

Figure 1:
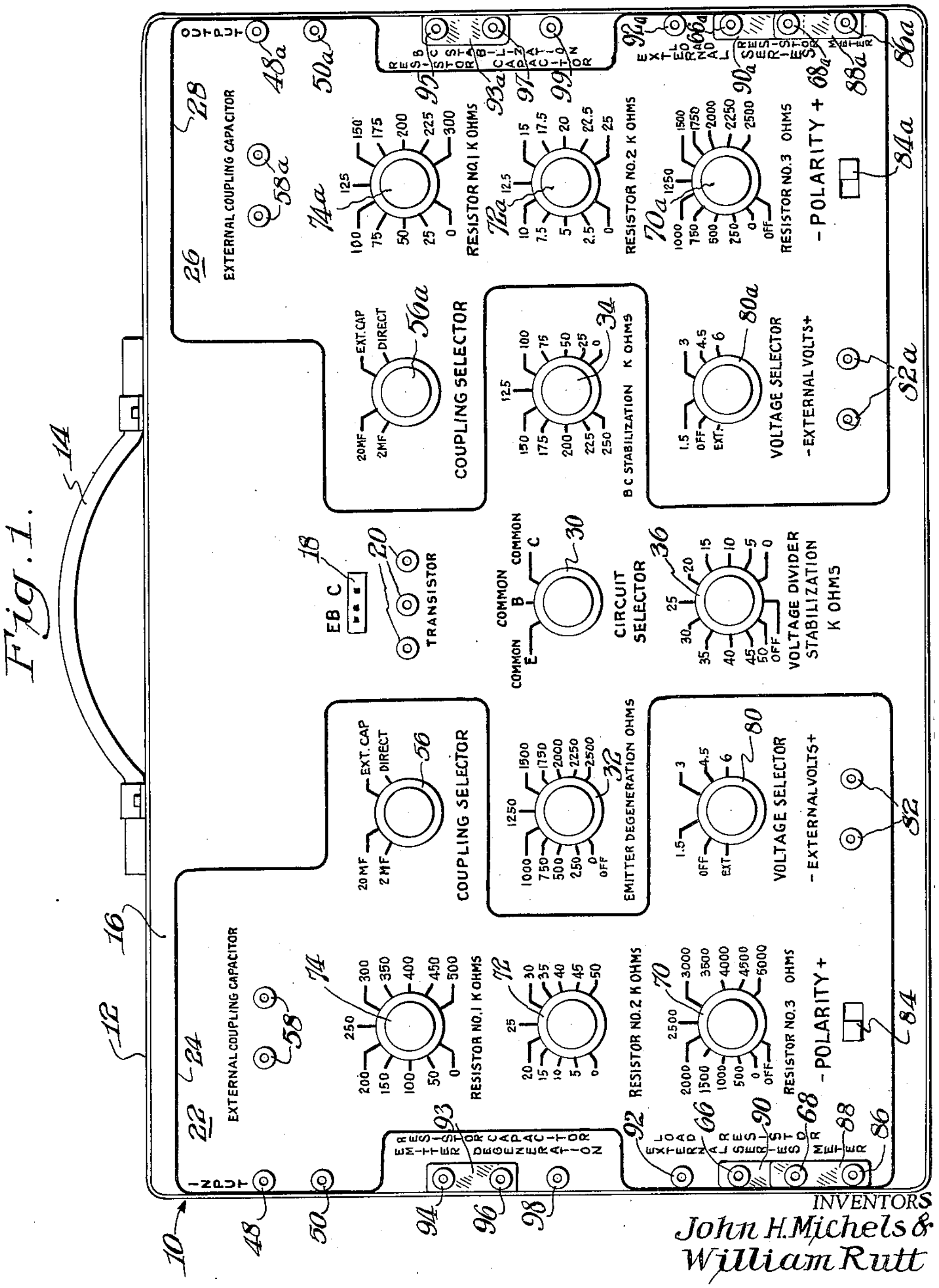
FIG. 1 is a front view in elevation of an embodiment of this invention.

In FIG. 1 is shown a device 10 for simulating transistor circuits which is, for example, incorporated within a portable casing 12 which, for example, can be carried by a handle 14. Casing 12 includes a front panel 16 upon which are conveniently mounted various manually operable control elements and terminal sockets which are fully described in the following.

Figure 2:
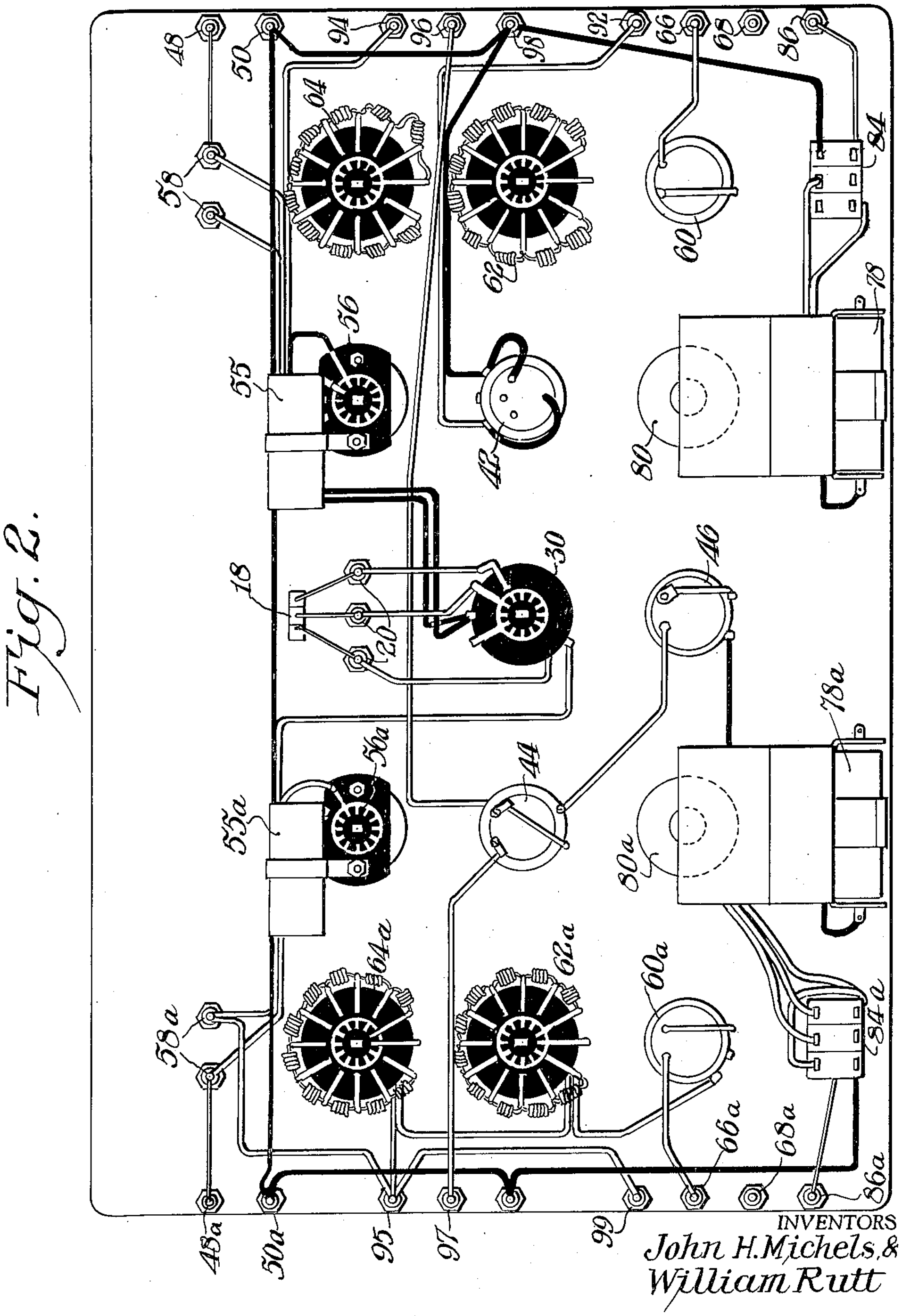
FIG. 2 is a rear view in elevation of operative components of the embodiment shown in FIG. 1.
Figure 3:
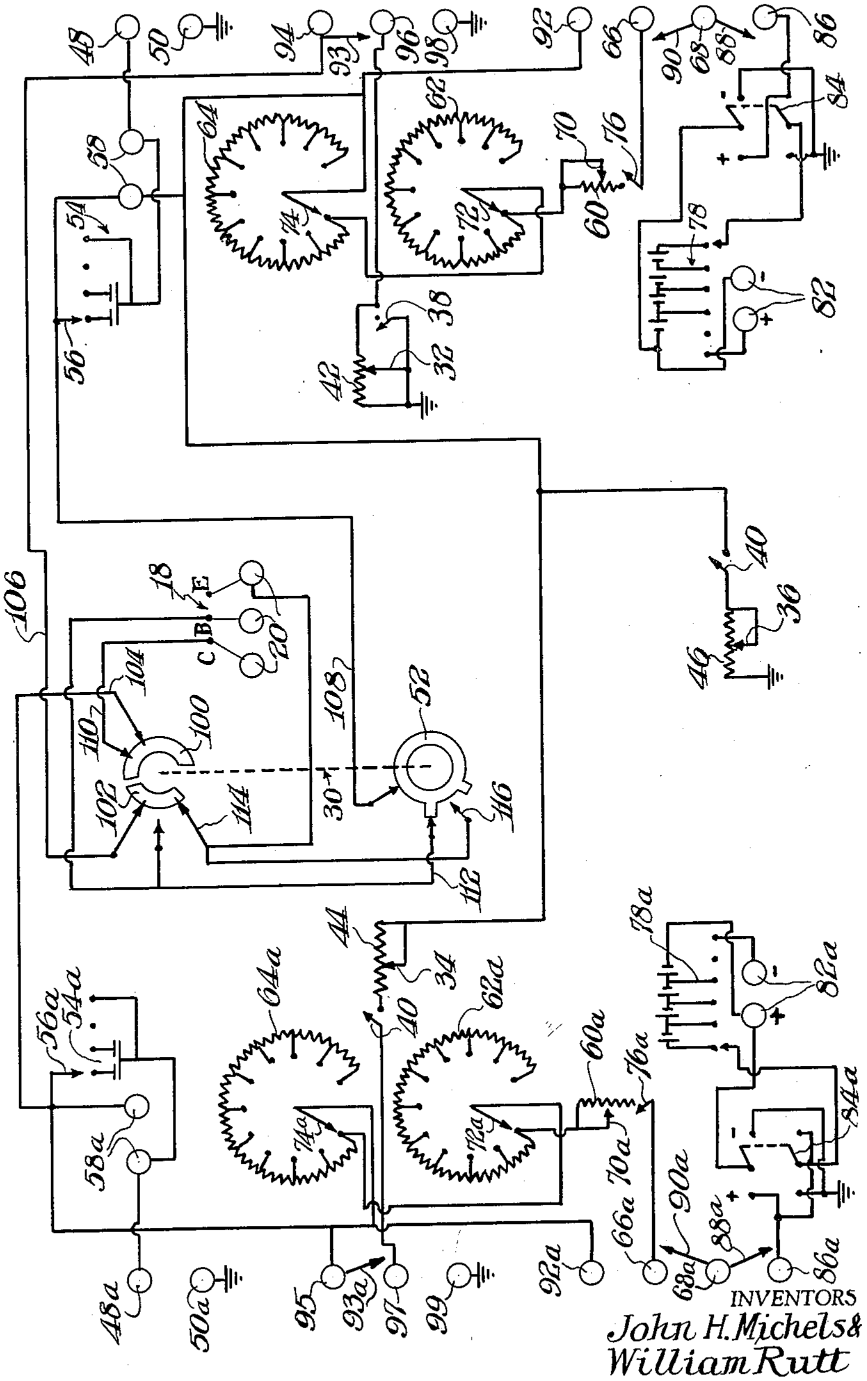
FIG. 3 is a schematic view of the embodiment shown in FIGS. 1 and 2 corresponding to the physical arrangement shown in FIG. 2.

In describing these control and terminal socket elements, reference is simultaneously made to FIGS. 1, 2 and 3 in order to simultaneously correlate physical and electrical characteristics of each of these components.

Alternate transistor socket means 18 and 20 are disposed, for example, approximately at the center of the panel which symbolically corresponds to the functional disposition of the transistor at the center of a conventional schematic diagram. Alternate socket means 18 and 20 are provided for accommodating two of the standard types of connecting leads or prongs incorporated in conventional transistors. Each of these socket means includes three sockets designated E, B, and C respectively, corresponding to emitter, base and collector.

An input circuit section 22 is, for example, disposed at one side of panel 16, and it is delineated by an enclosing line 24 to help associate the panel elements incorporated in the input circuit. An output circuit section 26 is, for example, disposed at the other side of the panel, and it is delineated by an enclosing line 28 to associate the panel elements incorporated in the output circuit. This arrangement, therefore, graphically duplicates the functional characteristics of the conventional schematic electrical diagram for a transistor circuit.

A circuit selector switch control means 30 is positioned for example, at the physical center of the panel below the socket means 18 and 20 for selectively connecting these sockets with the input, output and common circuits in a preselectable variety of conventional transistor circuit configurations. These conventional circuit configurations include those conventionally referred to as the common emitter, common base, and common collector type circuits. Also positioned, for example, at the center of the panel between the sections reserved for the input and output circuits, are control elements 32, 34 and 36 respectively operatively associated with variable impedance elements 42, 44 and 46 which are, for example, variable resistors which are connectable in predetermined advantageous circuit arrangements with the input, output and common circuits in the manner described in the following.

Variable resistor 42 is connectable in series with the common circuit, variable resistor 44 is connectable across the output and input circuits, and variable resistor 46 is connected across the input and common circuits. This permits the circuits to respectively perform the functions known to one skilled in this art, for example, as emitter degeneration control, base-collector stabilization and voltage divider stabilization when selector switch 30 is set to provide the common emitter type circuit. These circuit configurations are particularly advantageous for stabilizing the current characteristics of a transistor circuit to prevent the occurrence of thermal run-away.

When the selector switch means 30 connects the input, output and common circuits in other conventional circuits such as the common base or common collector type circuits, the aforementioned designations do not specifically apply, but a designer who understands the aforementioned types of circuit arrangements can utilize them for analogous control in some instances. For example, in the common base type circuit, the emitter degeneration variable resistor 42 and associated control 32 can be used for a somewhat analogous purpose. Other circuit arrangements associated with suitable control elements to provide different circuit arrangements which are advantageous for other purposes can be alternatively or additionally provided.

The emitter degeneration resistor 42 is bridged by a shunting arrangement including a switch 38 which permits it to be shunted out of the circuit when control element 32 is turned to the "off" position. This permits all of its resistance to be effectively removed from influence upon the common circuit. Resistors 44 and 46 are merely disconnected from respective circuits in the "off" position by means of disconnecting switches 40, for example, which are opened when controls 34 and 36 are turned to the "off" position.

The input and output circuits include similar elements and, therefore, in the interest of simplicity, only one set of these elements is described, for example, the set incorporated in the input circuit. The following elements incorporated in the input circuit are, therefore, designated by reference numerals, and the corresponding elements of the output circuit are designated with similar reference numerals for similar parts followed by the suffix "*a*."

Input terminals 48 and 50 are connected in shunt with the input circuit for feeding a signal thereto. Terminal 48 is connected to selector switch contact element 52 through a coupling capacitor configuration 54 controlled by a coupling selector switch 56. Coupling selector switch 56 includes means for coupling the input circuit to the input signal providing means through predetermined capacitor arrangements, for example, through either one of a pair of capacitors respectively having a 2 and 20 microfarad capacitance. These capacitors 54, for example, are of the nonpolarized electrolytic type, and they are incorporated in the single units 55 and **55*a* shown in FIG. 2. Coupling selector switch 56 also has a position designated external or Ext. which disconnects capacitors 54 and connects a pair of external coupling capacitor terminal sockets 58** in series at which a capacitor having any desired characteristics may be plugged in.

Variable impedance means 60, 62 and 64, for example, variable resistors 60, 62 and 64, are connected in series within the input circuit to the transistor element to provide a means for varying the input bias. Control means 70, 72 and 74 are operatively associated with variable resistors 60, 62 and 64 for varying the resistances. These variable resistors 60, 62 and 64 are connected in series with each other, and they are, for example, variable respectively from 0–5000 ohms, 0–50,000 ohms and 0–500,000 ohms. A total of 555,000 ohms in convenient steps may thereby be provided in the input load circuit. In addition, a pair of external resistor terminals 66 and 68 are connected in series with resistors 60, 62 and 64 to permit an external resistor of any given value to be interposed in the input bias circuit. A cut-off switch 76 is operatively associated with control element 70 to permit the series of variable bias resistors to be disconnected when, for example, the input signal is transformer-coupled to the input circuit at terminals 66 and 92, which is connected to input contact element 52 as is later described.

An internal source of potential 78, for example, providing voltages of 1.5, 3, 4.5 and 6 volts is connected in the input circuit and is, for example, a dry cell array. Control of the applied potential is obtained through a voltage selector switch 80 which includes an "off" position in which the source of potential is disconnected from the input circuit and an external position which connects terminal socket means 82 into the circuit to permit a source of potential of any given value to be connected in the input circuit. Furthermore, a double pole, double throw switch 84 is connected in the potential source circuit for reversing the polarity of the applied potential.

A terminal 86 is positioned below terminal 68 to permit a metering means to be connected in series with the input circuit. A bridging bar 88 is provided for connection across the terminals 68 and 86 for completing the circuit when no meter is connected therein. Another bridging bar 90 is provided between terminals 68 and 86 to complete the circuit when no external resistor is connected thereto. Terminal 92 is positioned adjacent terminal 66 for permitting transformer coupling of an external circuit to the input. Terminals 92 and **92*a* are respectively used in conjunction with terminals 66 and 66*a* to provide a means of connecting either the primary or secondary of a transformer respectively for the input and output circuits in place of the resistances provided by variable resistors 60, 62 and 64 and 60*a*, 62*a* and 64*a*. In transformer coupling, control element 70 is set at the "off" position which opens switch 76**.

A set of three terminals 94, 96 and 98 is connected series and shunt with emitter degeneration resistor element 42 to permit the connection of external impedances, for example, resistors in series and capacitors in shunt with emitter degeneration element 42. Terminals 94 and 96 are, for example, connected in series with elements 42 and terminals 96 and 98 are connected in shunt therewith. Terminal 96 is a common terminal of both pairs. Terminals 95, 97 and 99 disposed adjacent the output side of the panel are functionally similar to terminals 94, 96 and 98 with the difference that they are associated with the B-C or base-collector stabilization element 44 instead of with the emitter degeneration element 42. A bridging bar 93 is provided for connection across terminal sockets 94 and 96 when an external resistor is not utilized. Bridging bar **93*a* is provided for connection across terminal sockets 95 and 97** when an external resistor across them is not utilized.

Selector switch 30 includes, for example, front and rear contact elements. The front contact element includes, for example, two separate contacts 100 and 102. Contact segment 100 is referred to as the output segment because it is connected to the output circuit through lead 104 and associated sliding contact. Contact segment 102 is referred to as the common or ground segment because it is connected to the ground or common circuit through lead 106 and associated sliding contact. The rear element is a unitary element 52 which is referred to as the input segment because it is connected to the input circuit through lead 180 and associated sliding contact. The collector terminals, "C," of socket means 20 and 18 are connected to output segments 100 by means of a lead 110 and sliding contact. The base terminals B are connected to the input segment 52 through lead 112 and associated sliding contact. Emitter terminals E are connected to common or ground segment 102 and input segment 52 alternatively by means of leads 114 and 116 and associated sliding contacts.

In the position of the selector control 30, shown in FIG. 3, the emitter is connected to the ground or common circuit; the base is connected to the input circuit; and the collector is connected to the output circuit to provide a common emitter type circuit. The other positions of the selector switch rotate contact elements 100, 102 and 52 to other positions which provide the common base type and common collector type circuits.

*Operation*

In determining optimum parameters for a given transistor circuit, the transistor itself is first plugged into either socket means 18 or 20. The selector means is positioned to provide either the common emitter, common base or common collector type circuits. The following discussion is limited to the use of this device in conjunction with the common emitter type circuit, and the modified manner of its use in conjunction with the common base or common collector circuits will be thereby apparent to one skilled in the art.

For a detailed discussion of the manner in which an instrument of this type may be used, reference may be made to a publication of the Sprague Products Company, North Adams, Massachusetts, entitled "Sprague Operating Manual Model LF–1 Transimulator," copyright 1957, Sprague Products Company.

Depending on whether a PNP or NPN transistor is used, the polarity determining switches 84 and 84*a* in the input and output circuits respectively are adjusted accordingly. The desired voltages in the input and output circuits are provided thereto by adjustment of voltage selector controls 80 and 80*a* in the input and output circuits respectively, or a different desired voltage is provided by connecting an external potential source, for example, of the mercury type, to terminals 82 and 82*a*.

A micro-milliammeter, for example, is connected to terminals 68 and 86 in the input circuit and 68*a* and 86*a* in the output circuit, or the bridging or shorting bars 88 and 88*a* are connected across these terminals.

A signal generator of any type is connected, for example, to input terminal 48 and 50, and an oscilloscope, for example is connected to output terminals 48*a* and 50*a* to permit the shape of the output wave form to be compared with the input wave form to determine the effect on the wave form by the circuit arrangement provided in the device.

Initially, the controls 32, 34 and 36 relating to emitter degeneration, base-collector stabilization and voltage divider stabilization are in the "off" position which eliminates their influence from the circuit.

Figure 4:
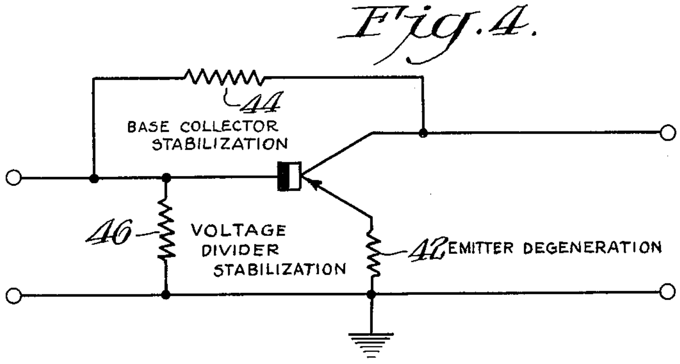
FIG. 4 is a schematic diagram of one type of circuit arrangement that can be provided by the embodiment shown in FIG. 1.

In FIG. 4 is shown a schematic diagram of a grounded emitter type circuit in which the elements 42, 44 and 46 regulated by control switches 32, 34 and 36 are indicated in their relative positions in the grounded or common emitter type circuit. Each of these elements is then adjusted by means of its associated control to provide optimum performance parameters for a given transistor, and these parameters are then determined by a reading of the settings of control elements 32, 34 and 36 or ohmmeter measurement between terminals. Resistor controls 70, 72 and 74 in the input circuit, and 70*a*, 72*a* and 74*a* in the output circuit are adjusted to provide the proper impedances therein, for example, for macthing circuits to which the given circuit is to be connected. The terminal sockets about the periphery or edge of the device are utilized to incorporate resistors and capacitors and voltage supplies of any given magnitudes and characteristics which are not obtainable by settings of the dials.

In the illustrated common emitter type circuit, elements 42, 44 and 46 are connected to respectively provide functional characteristics designated as emitter degeneration, base-collector stabilization and voltage divider stabilization, as illustrated schematically in FIG. 4 which represents the circuit for a common or ground emitter type amplifier. Controls 32, 34 and 36, however, may also be used when selector switch 30 is switched to a common base or collector type circuit for determining parameters of impedance to be inserted in these circuits also where they prove advantageous. However, the principal known usefulness of controls 32, 34 and 36 resides in the functional designations with which they have been marked which refer only to common emitter type circuits. However, the mode of connection of these or other impedance elements may be varied to suit any particularly advantageous circuit arrangement for achieving stabilization, for example, or achieving any other beneficial effect in any other type of transistor circuit. The variable resistors or variable impedance controls in the input and output circuits, however, are clearly universally applicable.

The coupling selectors 56 and 56*a* are used in the manner described to vary the form of capacitive coupling of the input and output circuits, and they are also associated with terminals 58 and 58*a* for utilizing capacitors of any given value in the circuit.

Although a general outline of only one manner in which this instrument is used has been described herein, the various components may be utilized by one skilled in the art to provide a great variety of circuit configurations for determining the optimum parameters of auxiliary components in a given transistor circuit. The aforementioned instruction manual describes in detail many ways in which the information derived from this instrument may be used for determining significant information relative to optimum transistor circuits and even the transistors themselves. For example, this instrument may be used either to simulate circuits including a single transistor, or a number of these devices may be connected in cascade or parallel by using a separate device for each stage. This instrument may also be used for testing the characteristics of the transistors themselves by plugging the transistor to be tested into a predetermined circuit configuration and then comparing the output signal with the input signal to see that it meets specifications.

What is claimed is:

1. A device for determining optimum parameters for a transistor circuit comprising a casing including a panel; socket means mounted upon said panel for connecting said transistor into said circuit; a number of separate circuits disposed within said casing including input, output, and common circuits; input and output terminal means connected respectively with said input and output circuits for respectively providing and metering an input signal thereto and deriving and metering an output signal therefrom; potential source means associated with said input and output circuits for providing operating voltages thereto; said input and output circuits respectively including manually variable impedance means; selector switch means mounted upon said panel and connecting said socket means with said input, output and common circuits in a preselectable variety of conventional transistor circuit configurations; additional variable impedance means disposed in arrangements which are connectable in predetermined advantageous circuit arrangements relative to said input, output and common circuits; control means operatively associated with each of said variable impedance means for adjusting the values of impedance provided by each of said variable impedance means and for optionally applying and removing their influence on their respective circuits; indicating means mounted upon said panel adjacent said control means for recording the settings of said control means which provide said optimum parameters; said additional variable impedance means including a first variable resistor means connected in series with said common circuit; a second variable resistor means connected across said output and said input circuits; and a third variable resistor means being connected across said input and said common circuits.

2. A device as set forth in claim 1 wherein said socket means, said selector means, and the controls associated with said additional first, second and third variable resistor means are disposed substantially at the center of said panel; and the control means associated with the variable impedance means incorporated in said output and input circuits are disposed on opposite sides of said panel to graphically associate the control elements associated with separate portions of said device with the positions that they conventionally assume in an electronic schematic diagram.

3. A device as set forth in claim 1 wherein coupling capacitor means are disposed between said input and output terminals and said input and output circuits, and coupling selector switches are provided for varying the capacitive influence of said coupling means and for optionally shunting them out of said input and output circuits.

4. A device as set forth in claim 3 wherein the coupling capacitors incorporated in said coupling means are of the non-polarized electrolytic type.

5. A device as set forth in claim 1 wherein auxiliary terminal means are mounted upon said panel and connected with said first and second variable resistor means in a manner to permit external impedance elements to be optionally connected in series and shunt with said first and second variable resistor means.

6. A device as set forth in claim 1 wherein said control means associated with said first variable resistor means includes shunt means for removing the influence of said first variable resistor from said common circuit.

7. A device as set forth in claim 1 wherein said control means associated with said second and third variable resistor means include switching means for disconnecting said second and third variable resistors from their respective circuits, and said variable resistors and indicating means are constructed and arranged to proceed from the disconnected position to values of resistance which successively change from higher resistances to lower resistances to prevent initial high current flow through said circuits which might damage said transistor.

8. A device as set forth in claim 3 wherein external terminal socket means are connected with said coupling selector switches and said potential source means for permitting the connection of external capacitors and voltage sources respectively thereto, and control means associated with said coupling capacitor means and said potential source means for controlling the respective values of internal capacitance and voltage provided thereby and for optionally switching said coupling capacitor means out of the circuit and interposing said externally connected capacitances and voltage sources therein.

9. A device as set forth in claim 1 wherein polarity reversing switch means are connected between said potential sources and said input and output circuits for controlling the polarity of said applied voltages.

10. A device as set forth in claim 1 wherein pairs of terminals are respectively connected in series with said input and output circuits for connecting current metering means thereto.

11. A device as set forth in claim 11 wherein pairs of terminals are connected in series with said manually variable impedance means in said input and output circuits to permit connection of an external resistor in series therewith, and one of said terminals being a common terminal shared with said aforementioned meter terminals.

12. A device as set forth in claim 11 wherein bridging means are provided for normally shunting said resistor and metering terminals out of said respective circuits.

13. A device as set forth in claim 2 wherein said center portion of said panel devoted to said socket, said selector switch, and the controls associated with said predetermined advantageous circuit arrangements is clearly demarcated from said portions of said panel devoted to control elements associated with said input and output circuits.

14. A device as set forth in claim 11 wherein pairs of terminal socket means are respectively connected in shunt with said manually variable impedance means in said input and output circuits to permit said circuits to be transformer coupled to external circuits, and switch means are respectively associated with said variable impedance means for disconnecting them from said input and output circuits when external circuits are transformer coupled thereto.

References Cited in the file of this patent

UNITED STATES PATENTS 2,856,585 Gibbons .............. Oct. 14, 1958

OTHER REFERENCES

"Production Tester," Electronics, October 1950; pp. 96–99.

"Junction Transistor Test Set," Radio-Electronic Engineering, March 1955; pp. 7–9, 33 and 34.

"Transistor Testing and Handling," Radio-Electronics, February 1957; pp. 61–63.